United States Patent
Marathe et al.

(10) Patent No.: US 7,770,681 B2
(45) Date of Patent: Aug. 10, 2010

(54) TRACTION CONTROL METHOD IN MACHINE USING LOCKABLE DIFFERENTIAL

(75) Inventors: Sameer S. Marathe, Naperville, IL (US); Scott A. Marks, Plainfield, IL (US); Bradford J. Holt, Edwards, IL (US)

(73) Assignee: Caterpillar Inc, Peoria, IL (US)

( * ) Notice: Subject to any disclaimer, the term of this patent is extended or adjusted under 35 U.S.C. 154(b) by 323 days.

(21) Appl. No.: 11/786,288

(22) Filed: Apr. 11, 2007

(65) Prior Publication Data
US 2008/0255735 A1 Oct. 16, 2008

(51) Int. Cl.
*B60K 28/16* (2006.01)
*B60T 7/12* (2006.01)

(52) U.S. Cl. .................. 180/197; 180/235; 701/50; 701/83; 701/51

(58) Field of Classification Search .......... 180/197, 180/235; 701/50, 83, 51
See application file for complete search history.

(56) References Cited

U.S. PATENT DOCUMENTS

| | | | |
|---|---|---|---|
| 2,874,790 | A | 2/1959 | Hennessey |
| 3,732,752 | A | 5/1973 | Louckes et al. |
| 3,788,166 | A | 1/1974 | Hart et al. |
| 4,162,712 | A | 7/1979 | Nelson |
| 4,347,760 | A | 9/1982 | Jewett |
| 4,549,448 | A | 10/1985 | Kittle |
| 4,570,509 | A | 2/1986 | Nighswonger |
| 4,589,511 | A | 5/1986 | Leiber |
| 4,775,026 | A | 10/1988 | Sollbach et al. |
| 5,301,769 | A | 4/1994 | Weiss |
| 5,351,192 | A * | 9/1994 | Tsuyama et al. ............ 701/84 |
| 5,366,042 | A | 11/1994 | Wilks et al. |
| 5,450,919 | A * | 9/1995 | Shitani ................. 180/233 |
| 5,505,267 | A * | 4/1996 | Orbach et al. ............ 172/3 |
| 5,529,136 | A | 6/1996 | Zulu |
| 5,535,124 | A | 7/1996 | Hosseini et al. |
| 5,574,643 | A * | 11/1996 | Yesel ................... 701/88 |
| RE36,152 | E | 3/1999 | Hosseini et al. |
| 5,927,422 | A * | 7/1999 | Schakel ................ 180/197 |
| 5,970,821 | A * | 10/1999 | Koyama et al. ......... 74/731.1 |
| 5,980,415 | A | 11/1999 | Showalter |
| 6,007,454 | A | 12/1999 | Takahira et al. |
| 6,009,969 | A | 1/2000 | Salcher et al. |

(Continued)

FOREIGN PATENT DOCUMENTS

DE 19749919 A1 11/1997

(Continued)

*Primary Examiner*—Lesley Morris
*Assistant Examiner*—Marlon A Arce
(74) *Attorney, Agent, or Firm*—Liell & McNeil

(57) ABSTRACT

A method of operating a machine having a lockable differential includes monitoring a first operating parameter indicative of wheel slip, and monitoring a second operating parameter different from the first parameter, the method further including controlling locking and unlocking of the differential responsive to the second operating parameter. A machine is provided having an electronic controller including software control logic for controlling locking and unlocking of a differential, the electronic controller being configured to lock the differential where the machine is in an operating mode where wheel slip is likely, such as a digging/dozing mode. Satisfaction of criteria for locking may be recognition by the controller of a predetermined pattern of sensor inputs corresponding with a likely wheel slip condition, or actual slip detection.

10 Claims, 7 Drawing Sheets

U.S. PATENT DOCUMENTS

| | | |
|---|---|---|
| H1851 H | 6/2000 | Kelley et al. |
| 6,085,138 A | 7/2000 | Smith et al. |
| 6,174,255 B1 | 1/2001 | Porter et al. |
| 6,578,648 B2 * | 6/2003 | Bell ........................ 180/24.11 |
| 6,631,320 B1 | 10/2003 | Holt et al. |
| 7,195,579 B2 * | 3/2007 | Claussen et al. .............. 477/35 |

FOREIGN PATENT DOCUMENTS

| | | |
|---|---|---|
| JP | 2003237619 | 8/2003 |
| WO | WO 02/49896 | 6/2002 |

* cited by examiner

TRACTION CONTROL METHOD IN MACHINE USING LOCKABLE DIFFERENTIAL

TECHNICAL FIELD

The present disclosure relates generally to traction control in a machine using a lockable differential, and relates more particularly to a method whereby a locking state of a differential in a machine is controlled responsive to an operating parameter other than wheel slip.

BACKGROUND

Many modern machines are designed to operate in relatively rugged environments where maintaining traction can be challenging. Off-highway trucks, tractors, loaders and graders in particular are often required to perform in poor underfoot conditions. When traveling across slick mud or ice, loose rock, etc., or when pulling a load or pushing a material pile, the rim pull of one or more wheels of the machine can be sufficient to cause wheel slip.

Most off-highway machines have a differential coupled with one or more axles so that the wheels may rotate independently of one another. While such differentials facilitate turning of the machine and thereby reduce wear on certain components, they allow torque to be disproportionately or exclusively provided to a slipping wheel. Once a wheel begins to spin, the wheel at the opposite end of the axle may not be powered at all, at best reducing productivity and, at worst, stranding the machine. Thus, while the use of differentials is certainly advantageous, they can introduce their own set of challenges.

One method of addressing wheel slip problems in wheeled machines having differentials is to provide a selective braking mechanism which applies a brake to a spinning wheel, and thereby allows torque to be returned to the opposite wheel of a given axle. While selective braking approaches have worked well, they tend to cause undesirable wear of the brake components, and require the use of relatively complex control systems to sense wheel slip and selectively brake an individual spinning wheel. Moreover, using the machine brakes to reduce wheel slip inherently generates heat, which can prevent the use of brakes for traction control over long periods of time.

Another approach engineers have taken to wheel slip problems has been to provide a selective differential locking mechanism that allows an operator to rotatably couple the wheels of an axle together. Rather than one wheel spinning while the other sits idle, when the differential is locked the wheels rotate together, continuing to provide motive power to the machine even if one wheel encounters a slick or loose surface. Conventional locking differentials include a clutch that may be engaged to frictionally couple each half of the subject axle together. An operator control button, lever or similar device is typically positioned in the operator cabin, such that he or she may engage the differential lock when a wheel begins to slip. While certain of the known locking differential designs have met with technical and commercial success, such designs have various shortcomings.

For instance, because lockable differentials are typically manually operated, the operator can be distracted from other controls in the cab by trying to appropriately lock or unlock the differentials. The operator will also typically not manually engage the lockable differential until the wheels are slipping substantially, resulting in undue wear on the tires. Similarly, the operator often may not unlock the differential at an appropriate time, resulting in wear and tear not only on the tires, but also on other components of the machine drive train.

In an attempt to address the shortcomings of certain manual designs, a variety of designs and processes have been introduced which are directed to automating certain aspects of differential locking control. One known design is described in U.S. Pat. No. 4,549,448 to Kittle. Kittle discloses an agricultural tractor, and discusses a differential lock control system for the tractor which includes a hydraulically-operated differential lock coupled with a solenoid valve. The solenoid valve may be energized to unlock the differential in response to sensed vehicle speed and brake application. The differential may be re-locked automatically based on other vehicle parameters such as steering pressure, wheel slip and draft force. In Kittle, locking and unlocking of the differential is thus controlled based on separate parameters.

While Kittle offers a design and process suitable for certain operating environments and certain machine types, there is always room for improvement. Kittle's use of separate operating parameters to trigger differential locking versus unlocking requires a relatively complex control and monitoring system. Moreover, in at least certain applications, Kittle's design is incapable of optimal operating efficiency. The differential may be unlocked responsive to a particular operating parameter, but not re-locked even where that parameter returns to a value or range where locking is appropriate.

The present disclosure is directed to one or more of the shortcomings or problems set forth above.

SUMMARY OF THE INVENTION

In one aspect, the present disclosure provides a method for controlling differential locking in a machine. The method includes monitoring at least one operating parameter of the machine other than wheel slip, including receiving signals indicative of a machine operating mode. The method further includes controlling locking of at least one differential of the machine responsive to the at least one operating parameter where the machine is in an operating mode where wheel slip is relatively more likely. The method still further includes controlling unlocking of the at least one differential responsive to the at least one operating parameter where the machine is in an operating mode where wheel slip is relatively less likely.

In another aspect, the present disclosure provides a machine including at least one axle that includes a lockable differential having a clutch and a clutch actuator coupled therewith. The machine further includes wheels coupled with the at least one axle and at least one sensor configured to monitor an operating parameter of the machine other than wheel slip. An electronic controller is further included which is configured to receive signals from the at least one sensor and responsively determine a machine operating mode, the electronic controller further being in control communication with the clutch actuator and configured to lock the differential responsive to the parameter when the machine is in an operating mode where wheel slip is relatively more likely. The electronic controller is also configured to unlock the differential responsive to the parameter when the machine is in an operating mode where wheel slip is relatively less likely.

In still another aspect, an electronic controller for selectively controlling a locking state of at least one differential of a machine is provided. The electronic controller is configured to monitor operating parameters of the machine other than wheel slip via signals from at least one sensor indicative of a machine operating mode. The electronic controller is further configured to selectively lock the at least one differential responsive to the monitored operating parameter when the machine is in an operating mode where wheel slip is relatively more likely, and configured to selectively unlock the at least one differential responsive to the monitored operating parameter when the machine is in an operating mode where wheel slip is relatively less likely.

DETAILED DESCRIPTION

Figure 1:
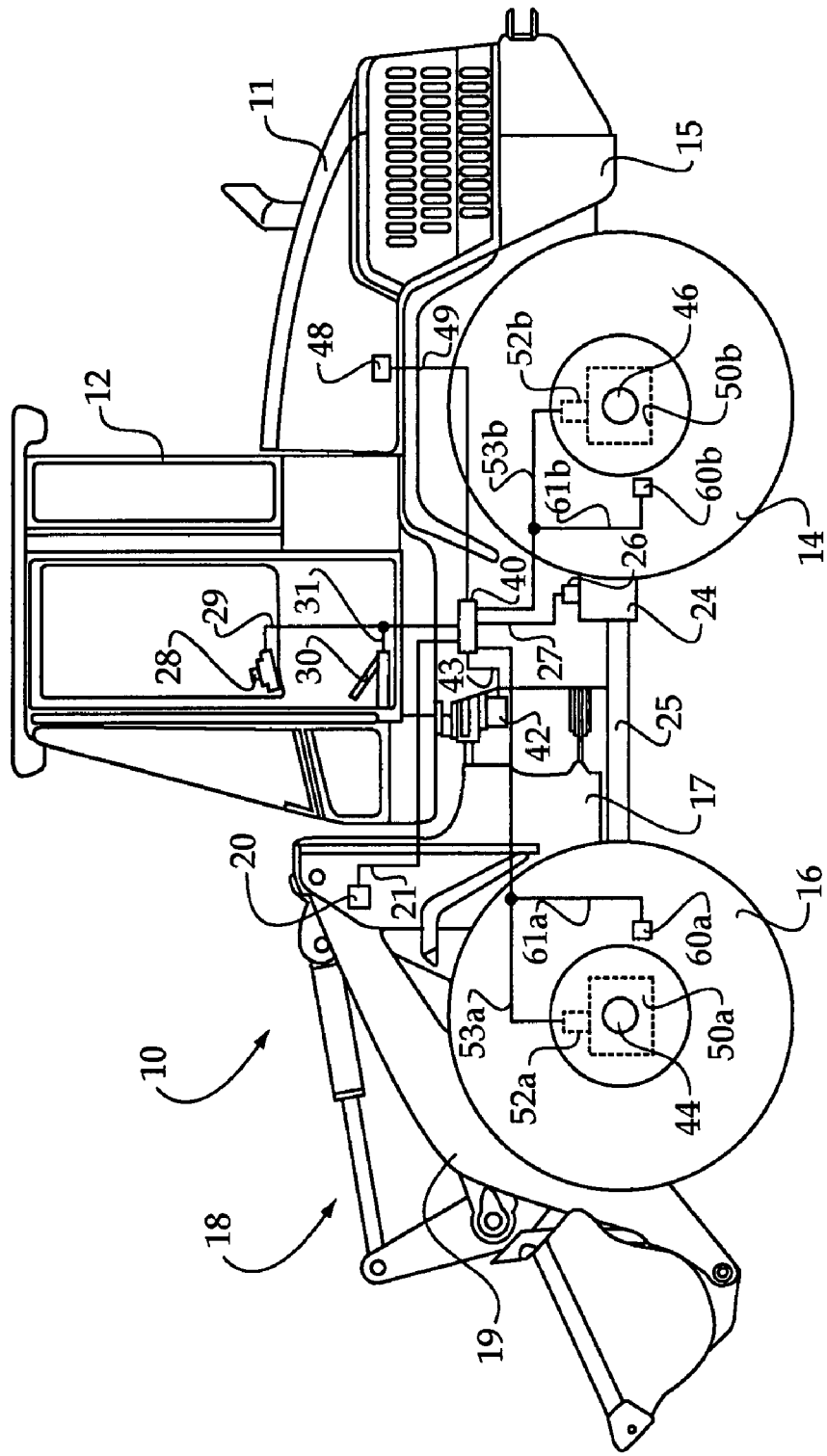
FIG. 1 is a side diagrammatic view of a machine according to the present disclosure.

Referring to FIG. 1, there is shown a wheeled machine 10 according to one embodiment of the present disclosure. Machine 10 is illustrated in the context of an articulated wheel loader having a body 11 with a back frame unit 15 and a front frame unit 17. Machine 10 may further include an operator cabin 12, back and front wheels 14 and 16, respectively, and a hydraulically actuated work implement linkage 18 having a boom 19. Machine 10 will include at least one axle, for example a front axle and a back axle 44 and 46, respectively, each having a lockable differential 50a and 50b. Machine 10 will further typically be an all-time all-wheel drive machine. However, it should be appreciated that the illustrated embodiment of FIG. 1 is exemplary only, and a wide variety of two-wheel and all-wheel drive machines are contemplated as falling within the scope of the present disclosure. Off-highway trucks, graders, other loader types, and virtually any other mobile wheeled machine having at least one lockable differential may benefit through the teachings of the present disclosure, and may therefore fall within its scope.

Machine 10 may further include a plurality of sensors coupled with an electronic controller 40 configured to control a locking state of differentials 50a and 50b responsively to one or more sensor input signals, as described herein. An engine speed sensor 48 is provided and connects with electronic controller 40 via a communication line 49. Wheel speed sensors 60a and 60b will typically be provided, each operably coupled with a wheel of machine 10 in a conventional manner. Signals from wheel speed sensors 60a and 60b may be communicated to electronic controller 40 via communication lines 61a and 61b, respectively, such that electronic controller 40 may determine or estimate a machine ground speed. Alternatively, another ground speed sensing means such as a radar device (not shown) may be provided.

Machine 10 may further include a linkage position sensor 20 operable to sense a position of linkage 18, for example, a lift angle of boom 19, and communicate the sensed position to electronic controller 40 via a communication line 21. An articulation angle sensor 42 may further be coupled with front and back frame units 15 and 17 and operable to send an articulation angle signal to electronic controller 40 via another communication line 43. Multiple articulation angle signals may be used by electronic controller 40 to determine or estimate an articulation rate between the respective frame units of machine 10.

Machine 10 will further typically include a transmission 24 that includes at least two gears, and may include at least three forward gears and a reverse gear, for example. Transmission 24 will typically be an automatic transmission having a torque converter (not shown). At least one sensor 26 may be coupled with transmission 24 and operable to sense a transmission input speed and communicate a signal corresponding to the same to electronic controller 40 via yet another communication line 27. Electronic controller 40 may be configured to determine a torque converter speed ratio via signals from engine speed sensor 48 and transmission input speed sensor 26. Alternatively, separate sensors could be used to sense a torque converter input speed and a torque converter output speed, or some other configuration could be used. The at least one sensor 26 may also comprise a transmission gear sensor operable to indicate the gear of transmission 24. One or more of sensors 26, 48, or other sensors may be used to sense, estimate or infer transmission output torque as well, in a conventional manner.

A set of operator controls, including a brake pedal 30 and an operator input device 28 are positioned in operator cabin 12. Another communication line 31 couples brake pedal 30, and, for example also a brake pedal position sensor (not shown), with electronic controller 40, allowing electronic controller 40 to determine a brake pedal position or angle. Operator input device 28 may consist of a button, control lever, or some other device such as a touch screen, and connects with electronic controller 40 via yet another communication line 31. Certain embodiments contemplated herein include a manual differential control mode, which may be selectively activated and deactivated via operator input device 28.

Figure 2:
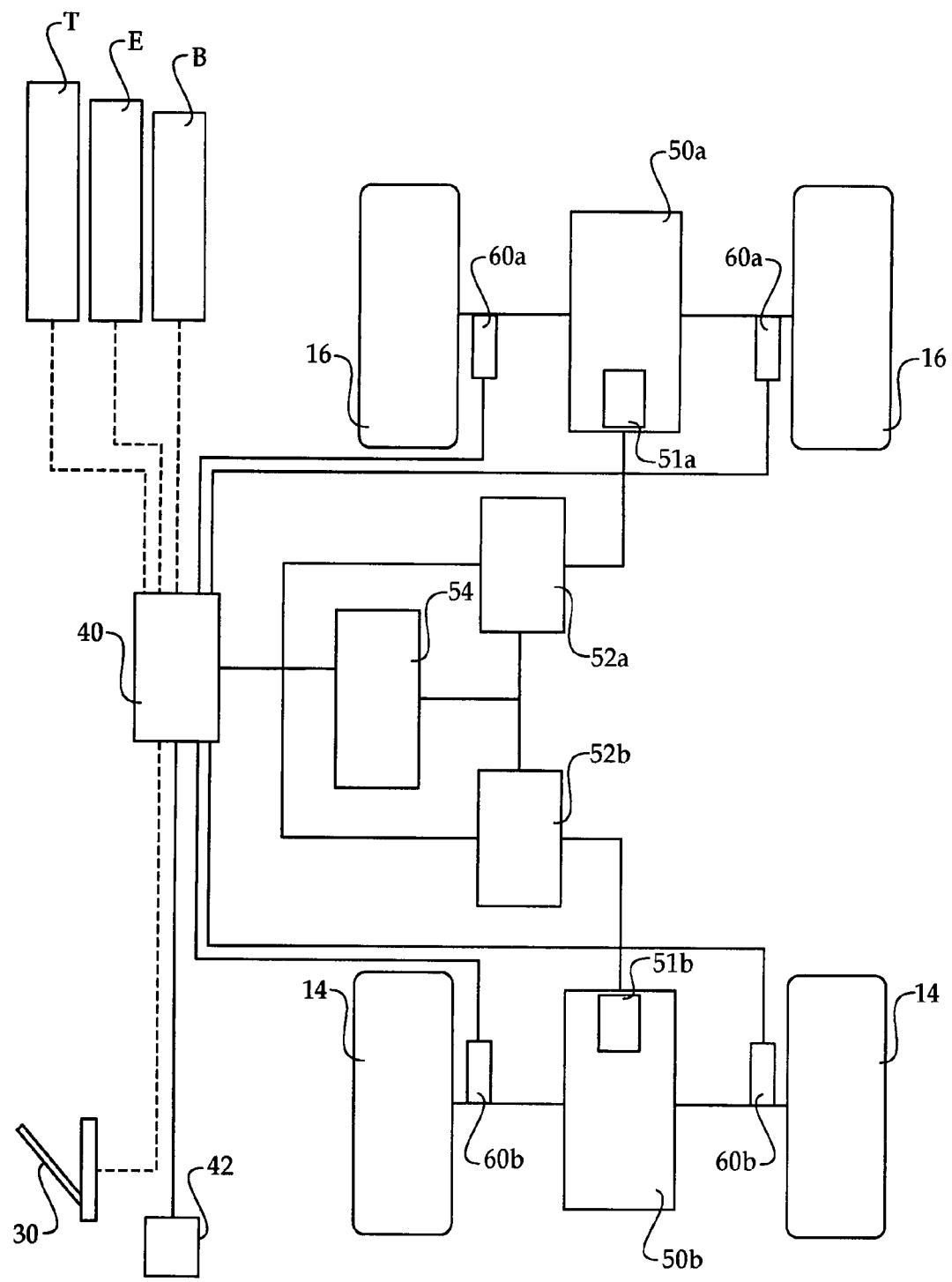
FIG. 2 is a schematic view of a portion of the machine of FIG. 1.

Referring also to FIG. 2, machine 10 will typically include an electro-hydraulic control valve 52a and 52b associated one with each of differentials 50a and 50b, respectively. Control valves 52a and 52b may be solenoid operated valves controllably coupled with electronic controller 40, and also with a hydraulic clutch actuator 51a and 51b, associated one with each of differentials 50a and 50b, respectively. Each of clutch actuators 51a and 51b will be operable to selectively lock or unlock the associated differential, responsive to fluid pressure/flow thereto as controlled by the respective control valves 52a and 52b. A typical, although not limiting strategy, will include biasing clutch actuators 51a and 51b toward an unlocked position. A proportional electrohydraulic valve 54 may be coupled with each of control valves 52a and 52b to apportion fluid flow/pressure thereto from a hydraulic system of the machine (not shown) in a conventional manner.

Thus, electronic controller 40 may be operable to generate an appropriate control command to each of valves 52a and 52b to adjust fluid pressure/flow to the clutch actuators, and thereby selectively lock or unlock the differentials associated therewith. While the presently described control process is discussed largely within the context of electro-hydraulic control over the locking state of each actuator, those skilled in the art will appreciate that the present disclosure is not thereby limited. For instance, electrical actuators rather than electro-hydraulic actuators might be used to control the locking state of the differentials. In FIG. 2, items T, E and B represent transmission input speed, engine speed and boom angle input signals, respectively, to electronic controller 40, the significance of which will be apparent from the following description.

The present disclosure further provides a method of operating a machine having at least one lockable differential. The method may include monitoring a first operating parameter of the machine that is indicative of wheel slip. As used herein, the term "indicative of" should be understood to include both direct and indirect determinations or estimations of wheel slip. A direct determination of wheel slip might include a comparison of wheel speed signals from left and right wheel speed sensors coupled with each axle, taking account of differences in expected wheel speed due to steering angle. Making such a determination is within the knowledge of one of ordinary skill in the art. A further example of directly monitoring an operating parameter indicative of wheel slip would be visual monitoring of wheel slip by a machine operator. An indirect measurement of wheel slip might include comparing expected ground speed with a determined ground speed. If determined ground speed differs from ground speed that is expected for a given wheel speed, a wheel may be determined to be slipping. In the context of machine 10, electronic controller 40 may continuously or intermittently receive wheel speed input signals from sensors 60a and 60b.

The method may further include monitoring a second operating parameter of the machine that is different from the first operating parameter, and may have a range of parameter values. As used herein, the term "different from" should be understood to mean that the second operating parameter is not in and of itself indicative of present wheel slip of the machine. The second operating parameter may have a range of parameter values, rather than simply an on or off state, for example. The method may further include controlling locking and controlling unlocking of the at least one lockable differential responsive to the second operating parameter. Thus, control of both locking and unlocking of the differential, as opposed to solely locking or solely unlocking, takes place based at least in part on the second operating parameter. It is further contemplated that the second operating parameter, which may include plural operating parameters, will be indicative of whether machine 10 is operating in a mode where wheel slip is likely. Hence, control of locking and unlocking may be based on whether wheel slip is likely, for example whether machine 10 is operating in a material interaction mode such as a dozing or digging mode.

In certain contemplated embodiments, the method may further include monitoring a plurality of operating parameters that are different from the first operating parameter. Monitoring the plurality of operating parameters different from the first operating parameter may include monitoring one or more of a ground speed of machine 10, articulation angle and articulation rate of back unit 15 relative to front unit 17, transmission gear, transmission output torque, torque converter speed ratio, and linkage position. Each of these operating parameters may be communicated via sensor output signals from the various sensors described herein to electronic controller 40.

The method may further include determining machine 10 is in an operating mode where wheel slip is likely. As described herein, based at least in part on input signals corresponding with the operating parameters different from wheel slip (the first operating parameter), electronic controller 40 may determine that wheel slip is likely. Once it is determined machine 10 is in a mode where wheel slip is likely, electronic controller 40 may generate differential locking control signals to each of control valves 52a and 52b to proactively lock the corresponding differentials, prior to wheel slip actually occurring. Where machine 10 is no longer in a mode where wheel slip is likely, electronic controller 40 may generate differential unlocking control signals.

Monitoring the second operating parameter may further include sensing an operating parameter specific to the determined operating mode. Locking and unlocking may then be triggered responsively to the parameter specific to the operating mode. For example, for a digging/dozing mode, described herein, boom lift angle may be a sensed parameter specific to the operating mode. Various input signal patterns to electronic controller 40 are contemplated to correspond with different operating modes where wheel slip is likely.

The method may further include controlling a locking state of differentials 50a and 50b based on the first operating parameter, indicative of wheel slip. Thus, the present disclosure provides a method whereby differentials 50a and 50b will be locked up if wheel slip in machine 10 is determined to be likely, as well as where wheel slip actually occurs. This approach differs from certain earlier designs, and in particular operator controlled lock-up schemes, where actual wheel slip needed to be detected before the differentials were locked. The present disclosure thus can increase operating efficiency and reduce undue wear and tear on the machine components, as compared to earlier desings.

As described, electronic controller 40 may proactively command locking of differentials 50a and 50b. Unlocking of differentials 50a and 50b will typically occur where parameter values sufficient to trigger lock-up are no longer detected. Unlocking control signals might be output to control values 52a and 52b, or outputting of locking control signals ceased, depending upon the system design, biased positions of valves 52a and 52b, etc. To avoid undesirable switching back and forth between a locked and an unlocked state as a given parameter value oscillates about a triggering value, slightly different parameter values may be used to trigger locking as compared to those used to trigger unlocking of differentials 50a and 50b.

In other words, the present control method may include different thresholds for locking than unlocking, and a buffer zone may lie in between the two thresholds, where no change in the locking state of the differentials is commanded. Where machine 10 is slowing down, for example, and it is desired to lock up differentials 50a and 50b, they may be locked once ground speed drops below a first reference speed. Where machine is speeding up, however, and it is desirable to lock differentials 50a and 50b, locking may not be initiated until ground speed rises above a different, higher reference speed. Thus, where the selected second operating parameter includes ground speed, for example, differential locking will be commanded when machine 10 is in a speed range that is relatively lower, whereas differential unlocking will be commanded when machine 10 is in a speed range that is relatively higher. The respective ranges in such an example are thus not contiguous, and each of the thresholds for initiating a change in the differential locking state may bound an intermediate range where no change will be commanded. Further examples and details of this aspect of the present disclosure are discussed below.

One practical implementation strategy contemplates proactive lock-up of differentials 50a and 50b where machine 10 is determined to be in either of a digging/dozing mode and a high-torque, low speed mode. In other embodiments, only the digging/dozing mode may be used. It is contemplated that the control logic processes for determining the occurrence of either of these operating modes might run in parallel. In addition to determining whether proactive lock-up is desired, electronic controller 40 may simultaneously determine whether wheel slip is actually occurring, i.e. via a slip detect routine running in parallel with the logic for digging/dozing and/or high-torque low speed. Thus, in at least certain embodiments, the presently described process may be thought of as simultaneously monitoring a plurality of operating parameters of machine 10 to determine if either of proactive, or reactive differential locking is desirable. Any time the appropriate criteria for either proactive or reactive differential lock-up are satisfied, different criteria being used for each mode, electronic controller 40 will appropriately command locking of differentials 50*a* and 50*b*. Where the triggering conditions no longer exist, or cease to exist for a predetermined time, electronic controller 40 may command that differentials 50*a* and 50*b* be unlocked or cease locking commands, etc.

Determining that machine 10 is in a digging/dozing mode and, hence, proactive lock-up of differentials 50*a* and 50*b* is desirable, may take place based on receipt of a predetermined pattern of sensor input signals corresponding to ground speed, machine gear, torque converter speed ratio and linkage position. Digging/dozing mode may occur, for example, where machine 10 is pushing or distributing a work material pile, loading the bucket of linkage 18, or grading a surface, for example. In such a mode, machine 10 will typically have linkage 18 lowered, and be traveling relatively slowly, and against the resistance generated by work material impinging on linkage 18.

In one exemplary digging/dozing mode embodiment, locking of differentials 50*a* and 50*b* may be commanded or authorized by electronic controller 40 if, for a predetermined time machine 10 is in a forward gear less than or equal to 2, ground speed has decreased below a predefined speed is speed, transmission output torque is greater than a reference torque, lift angle of boom 19 is less than a reference lift angle, and articulation angle is less than a reference articulation angle. The predetermined time could be, for example, 0.2 seconds, during which each of the conditions for locking should be satisfied. The predefined ground speed criteria may be a decrease from above 1 meter per second to below 0.7 meters per second, whereas the transmission torque reference may be 3500 Newton-Meters, and reference lift angle for boom 19 may be about −35 degrees. The reference articulation angle may be about 10°.

In such an embodiment, unlocking of differentials 50*a* and 50*b* may be commanded or authorized by electronic controller 40 if: ground speed is greater than a relatively higher reference ground speed; and, machine 10 is in a forward gear greater than 2, or in a reverse gear, and articulation angle is greater than about 16°. The relatively higher reference ground speed may be, for example, about 1.5 meters per second. Those skilled in the art will recognize that the use of different parameter values for locking vs. unlocking assures that electronic controller 40 will not rapidly lock and unlock differentials 50*a* and 50*b*, where the sensed parameter values oscillate about the appropriate triggering values.

Determining that machine 10 is in a high-torque, low-speed mode and, hence, proactive lock-up of differentials 50*a* and 50*b* is desirable, may take place based on a different predetermined pattern of sensor input signals from the pattern corresponding with digging/dozing mode. High-torque, low-speed mode may occur where machine 10 is traveling up an incline, or dragging a load for example. In particular, the predetermined pattern of sensor input signals may include signals corresponding with ground speed, articulation angle and articulation rate.

In one exemplary embodiment, electronic controller 40 may command or authorize locking of differentials 50*a* and 50*b*: if ground speed is less than a reference speed; articulation angle is less than a reference angle; and, articulation rate is less than a reference rate. The reference ground speed may be about 4.5 mph, the reference articulation angle may be about 8 degrees, and the reference articulation rate may be about 0.1 degrees per second.

Electronic controller 40 may further command or authorize unlocking of differentials 50*a* and 50*b* if: ground speed is greater than a relatively higher reference speed; articulation angle is greater than a relatively higher reference angle; and, articulation rate is greater than a relatively higher reference rate. The relatively higher reference speed may be about 5 mph, the relatively higher reference angle may be about 10°, and the relatively higher articulation rate may be about 1° per second. As discussed above, in many embodiments, only one of the described digging/dozing mode and high-torque low speed mode will be used. In some instances, however, satisfaction of the criteria for locking in one mode may be used to prevent unlocking of the differentials, even if that mode is not monitored to proactively lock the differentials. For example, lock-up might be triggered by satisfaction of digging/dozing lock-up criteria, but unlocking inhibited where lock-up criteria for high-torque low speed mode are satisfied. Such an embodiment would therefore utilize only the digging/dozing mode logic for lock-up, but could run both of the digging/dozing logic and high-torque low-speed logic for maintaining locked differentials.

The control routine for reactive lock-up of differentials 50*a* and 50*b*, a "slip detect" mode, may also take place in parallel with the proactive lock-up operations. In an embodiment employing slip detect, the method may further include controlling a locking state of differentials 50*a* and 50*b* based at last in part on the first operating parameter that is indicative of wheel slip. In such an embodiment, the method may further include determining whether a predetermined time has elapsed since a commanded gear change in transmission 24, and controlling the locking state of differentials 50*a* and 50*b* based at least in part thereon.

Electronic controller 40 may command or authorize locking of each of differentials 50*a* and 50*b*: if the predetermined time since commanding a gear change has elapsed; ground speed is greater than a reference speed; and, a predetermined wheel slip condition of machine 10 is sensed. If enabling conditions for reactive locking of differentials 50*a* and 50*b* are met, and enabling conditions for high-torque low-speed not met, for example, then electronic controller 40 may pulse differential lock actuators 51*a* and 51*b*. In one practical implementation strategy, electronic controller 40 may initially pulse clutch actuators 51*a* and 51*b* such that differentials 50*a* and 50*b* are engaged for approximately three seconds at a time, so that power will be returned to a non-slipping wheel relatively gradually.

Further, once wheel slip has been detected, and electronic controller 40 has reactively locked up differentials 50*a* and 50*b* as described above, the parameters for triggering proactive locking in the high-torque, low-speed mode, if used, may be temporarily modified. In other words, once electronic controller 40 determines that wheel slip has occurred, the parameter thresholds necessary to trigger proactive locking may be adjusted. In such an embodiment, once wheel slip has occurred, it may be desirable to lower the parameter thresholds for proactive differential locking to avoid the necessity of repeated reactive locking of differentials 50*a* and 50*b*. In particular, the parameter thresholds for locking differentials 50*a* and 50*b* may be temporarily set to include an articulation angle of less than about 8°, and a ground speed of less than about 12.5 mph. Thresholds for unlocking might include an articulation angle of greater than about 10°, and a ground speed of greater than about 13 mph. Thus, it will be noted that the range for proactive locking of differentials 50*a* and 50*b* via the high-torque, low-speed mode may be expanded following reactive locking of the differentials. The predetermined time period during which the thresholds are changed may be set via an ON Timer. When the ON Timer expires, electronic controller 40 may unlock the differentials and reset the parameter thresholds for high-torque, low-speed mode to normal values. If disabling/unlocking conditions are met, the ON Timer may be cleared and the differentials unlocked. Still further combinations/conditions for disengaging differentials after they have been locked may also be used, such as articulation rate and/or angle being less than certain thresholds for a time period, to ensure an operator is not intentionally adjusting articulation to get past a slick spot, for example.

In the slip detect routine, electronic controller 40 may command or authorize unlocking of differentials 50*a* and 50*b*, if the predetermined time has not elapsed, ground speed is less than the reference ground speed, and the predetermined wheel slip condition is not sensed.

Specific parameter values suitable for triggering reactive locking of differentials 50*a* and 50*b* may include a time since the last gear change of greater than about 1.5 seconds, a ground speed of greater than about 0.55 meters per second, and a detected wheel slip condition for about 0.5 seconds, i.e. where the wheels are determined to be slipping for approximately 0.5 seconds or longer. Specific parameter values suitable for commanding or authorizing unlocking differentials 50*a* and 50*b*, as per the reactive locking and unlocking routine, may include no wheel slip condition, a time since the last gear change of less than about 1.5 seconds, and a ground speed of less than about 0.5 meters per second.

The specific patterns of input signals which best correspond with appropriate conditions for locking and unlocking the differentials discussed above may be determined via operator/machine testing and/or computer simulation. Likewise, the appropriate size of the buffer zones between thresholds for proactive lock-up may be similarly determined. For example, appropriate machine parameters, and threshold parameter values for triggering differential locking and unlocking during a digging/dozing mode may be determined through a series of trials on test machines. To determine which parameters to consider, and what threshold parameter values are appropriate, operators may be tasked with actually performing digging operations. Across different trials, the reference ground speed, reference angle for boom lift and transmission output torque or torque converter speed ratio can be varied. In addition, the underfoot conditions upon which the digging operation is performed may be varied as well. Operator feedback may then be obtained regarding the quality of the differential locking and unlocking. In particular, it has been found that operator perception of the smoothness of operation for different parameter values, e.g. at different ground speeds and different torque converter speed ratios, may be useful in arriving at an acceptable strategy.

A similar approach may be used to determine appropriate operating parameters and parameter values for triggering locking and unlocking of the differentials in high-torque, low-speed operating mode. As noted above, however, the particular parameter values will typically be different for the different operations. For example, a different ground speed reference value is used to trigger locking in digging/dozing mode than in high-torque, low-speed mode. It has been determined that for digging/dozing mode, it is desirable to successfully lock differentials 50*a* and 50*b* approximately 95% of the time when performing a digging/dozing operation. In addition, it is desirable that the differentials stay locked during the entire digging/dozing event. For high-torque, low-speed operations, it is desirable that locking and unlocking of differentials 50*a* and 50*b* be substantially transparent to an operator when tested on a concrete work surface.

In addition to operator testing, appropriate parameter values for triggering locking and unlocking of the differentials in any of the above modes may be determined through computer simulation of the machine dynamics under different operating conditions. The appropriate parameter values for triggering the reactive locking and unlocking of the differentials, i.e. via a slip detect routine, may be particularly well suited to determination via computer simulation, followed by validation on actual test machines. A general guideline for determining the specific values consists of a comparison with a manual system. In other words, the automated slip detect routine should perform approximately as rapidly and consistently as manual control by a skilled operator on a particular work surface such as ice, slick soil or loose rock, for example.

Although the specific parameter values and/or ranges described above provide one practical implementation strategy, it should be appreciated that the actual parameter values selected to trigger locking and unlocking of the differentials in a machine may vary based on several factors. The type and size of machine, its moment of inertia, whether the machine typically operates in both loaded and unloaded conditions, and even operator preferences as to the smoothness or relative transparency of differential locking may all affect the specific parameter values selected for locking and unlocking the differentials of the machine in accordance with the present disclosure.

The presently described method may further include an enabling and disabling routine to ensure that electronic control over differential locking in machine 10 takes place only in appropriate conditions. In particular, electronic control may be enabled where ground speed is less than a reference ground speed, for example about 12.5 miles per hour, and decreasing. In addition, articulation rate and lift angle may also be of concern. Electronic control will typically be enabled where articulation angle is less than about 22 degrees, or where lift angle is less than about zero degrees, and where brake pedal rotation is less than about 5%.

Electronic control will typically be disabled where ground speed is greater than about 13 miles per hour, articulation angle is greater than about 24 degrees, lift angle is greater than about 2 degrees and brake pedal rotation is greater than about 17.5%. In general terms, if the enabling conditions are met, then differential locking will be allowed; if the disabling conditions are met, then differential locking will not be allowed and differentials 50*a* and 50*b* may be unlocked if necessary.

To implement certain of the aspects of the present disclosure, electronic controller 40 may include a computer readable medium such as RAM, ROM or another suitable medium having a control algorithm recorded thereon. It should be appreciated, however, that rather than the entire control process being software based, certain aspects of the control process could be carried out via dedicated hardware.

Electronic controller 40 may further be configured to recognize a predetermined pattern of sensor input signals from the various sensors described herein which corresponds with a likely wheel slip condition of machine 10, and responsively command locking of differentials 50*a* and 50*b*. The sensor group configured to communicate input signals corresponding with the predetermined pattern indicating a likely wheel slip condition may include a ground speed sensor or wheel speed sensors, articulation angle sensor 42, transmission sensor 26, linkage position sensor 20 and engine speed sensor 48. Electronic controller 40 may further be configured to recognize at least two different patterns of sensor input signals from the sensor group which correspond with a likely wheel slip condition of machine 10. The at least two different patterns of sensor input signals may correspond, for example, with the two different operating modes described herein which indicate machine 10 is in an operating mode where wheel slip is likely, i.e. digging/dozing and high-torque, low-speed modes. Electronic controller 40 may still further be configured to lock differentials 50a and 50b responsive to a determined wheel slip condition of machine 10, as described herein.

INDUSTRIAL APPLICABILITY

During operation, electronic controller 40 will typically be receiving regular input signals from each of the sensors described herein. The aforementioned control process will generally continuously repeat, each time evaluating the sensor inputs for a pattern corresponding with a likely wheel slip condition or an actual wheel slip condition. Either of a likely wheel slip condition or an actual wheel slip condition may trigger differential locking. These processes/routines may proceed in parallel, so that any time a signal pattern appropriate to trigger proactive or reactive differential locking is recognized by electronic controller 40, it may command or authorize locking of differentials 50a and 50b. Where no signal pattern triggering either proactive or reactive differential locking is recognized, then electronic controller will either do nothing, and repeat the evaluation or, if differentials 50a and 50b are locked, electronic controller 40 may command unlocking thereof.

Turning to FIG. 3a-e, there is shown a flowchart illustrating an exemplary control process 100 according to one embodiment of the present disclosure, including alternative versions of a Slip Detect routine, described hereinbelow. Control process 100 begins at a START 104, or initialization step and proceeds to step 106 wherein electronic controller 40 receives various input signals from sensors of machine 10, including for example brake pedal angle, transmission output torque, boom angle, articulation angle, articulation rate shut-off=OFF, wheel speeds, transmission gear, and slip-detect=OFF. If, for example, either of articulation rate shut-off=OFF or slip-detect=OFF is not true, then control process 100 may interrupt and start over.

From step 106, the process may proceed to step 110 wherein electronic controller 40 may calculate the necessary differential lock pressure. In other words, electronic controller 40 may determine at step 110 what hydraulic pressure should be provided to clutch actuators 51a and 51b to successfully lock differentials 50a and 50b. The necessary pressure may be determined by referencing a look-up table, for example, where pressure is mapped to machine ground speed. In general, higher ground speeds will require relatively higher pressures to lock differentials 50a and 50b.

From step 110, the process may proceed in parallel to steps 111, 129 and 132 to initiate identifying of the operating mode of machine 10. In step 111, electronic controller 40 may initiate an Auto Diff routine by determining an auto-diff value, corresponding with a predetermined pattern of sensor inputs that will be required to determine machine 10 is in a high-torque, low speed mode where proactive locking of differentials 50a and 50b is desirable. Step 129 represents initiation of a slip detect routine, corresponding generally with low-torque, high-speed operation of machine 10, wherein electronic controller 40 may determine whether a predetermined wheel slip condition exists such that reactive locking of differentials 50a and 50b is desirable. In step 132, electronic controller 40 will initiate a Dig Trigger routine and calculate a dig-trigger value, corresponding with a predetermined pattern of sensor inputs that will be required to determine machine 10 is in a digging/dozing mode and, hence, proactive locking of differentials 50a and 50b is desirable. Each of the different, parallel operations is described separately hereinbelow, although it will be recalled that all three operations will typically take place concurrently.

From step 111, the process may proceed to step 112, initiating determining parameter thresholds required to trigger locking of differentials 50a and 50b. From step 112, the process may proceed in parallel to steps 113, 114 and 115. Generally, in steps 113, 114 and 115, electronic controller 40 will implement a hysteresis feature to prevent differential locking and unlocking oscillations at the speed, articulation angle and articulation rate threshold values due to signal noise. In other words, the threshold values for locking and unlocking differentials 50a and 50b will be set such that they are sufficiently different to avoid oscillations.

In step 113, electronic controller 40 will query whether a Speed Exceed is ON. If Speed Exceed is ON, then the process may proceed to step 116 wherein the threshold ground speed for changing the locking state of differentials 50a and 50b may be set to about 3.0 mph, for example. If Speed Exceed is not ON at step 113, the process may proceed to step 117 wherein the threshold ground speed for changing the locking state of differentials 50a and 50b may be set to about 3.5 mph, for example. From either of steps 116 or 117, the process may proceed to step 122, described below.

In step 114, electronic controller 40 will query whether an articulation Rate Exceed is ON. If yes, the process may proceed to step 118 to set the threshold articulation rate for changing the locking state of differentials 50a and 50b to about 0.1 degrees per second, for example. If no, the process may proceed to step 119 to set the threshold articulation rate value to about 1 degree per second, for example. From either of steps 118 or 119, the process may proceed to step 122, described below.

In step 115, electronic controller 40 will query whether an articulation Angle Exceed is ON. If yes, the process may proceed to step 120 wherein electronic controller 40 to set the threshold articulation angle value for changing the locking state of differentials 50a and 50b to about 6 degrees, for example. If no, the process may proceed to step 121 to set the threshold articulation angle value to about 8 degrees, for example. From either of steps 120 or 121, the process may proceed to step 122.

In step 122, electronic controller 40 will query whether machine ground speed is less than the threshold speed, whether articulation angle is less than the threshold articulation angle, and whether articulation rate is less than the threshold articulation rate. Each of the described threshold values corresponds generally with the "reference" values described above. If all of the operating parameters are below their respective thresholds, the process may proceed to step 123 wherein electronic controller 40 will set auto diff to ON. In other words, in step 123 electronic controller 40 concludes that the machine is in a high-torque, low speed mode. If at step 122, the answer is false, the process will proceed to step 124 to determine that one or more of speed, angle and rate values exceed the respective threshold(s), and responsively set auto diff to OFF in step 125.

From either of steps 123 or 125, the process may proceed to step 126 wherein electronic controller 40 will query whether auto diff is set to ON. If true, then the process may proceed to step 128 wherein electronic controller 40 will set front and back diff lock multipliers equal to 1. If false at step 126, the process may proceed to step 127 to set front and back diff lock multipliers equal to zero. From either of steps 127 or 128, the process may proceed to step 145 wherein electronic controller 40 will sum the diff lock multipliers and adjust the locking state of differentials 50a and 50b via an appropriate differential locking or unlocking control signal to control valves 52a and 52b in step 146. If the sum is greater than 1, for example, differentials 50a and 50b will be locked.

It will be recalled that steps 111, 129 and 132 will typically proceed concurrently. Step 132 represents initiation of determining whether machine 10 is in a digging/dozing mode and, hence, whether proactive locking of differentials 50a and 50b is desirable. From step 132, the process may proceed to step 133 wherein electronic controller 40 will query whether a Dig Trigger is ON.

If at step 133 the answer is true, the process may proceed to step 134 wherein electronic controller 40 will query whether transmission gear is a reverse gear. If no, the process may proceed to step 136 to set a Dig Trigger to ON, in other words concluding that machine 10 is in a digging/dozing mode. If transmission gear is a reverse gear at step 134, the process may proceed to step 137 wherein electronic controller 40 will set Dig Trigger to OFF.

If at step 133 the answer is false, the process may proceed to step 135 wherein electronic controller 40 will query whether torque converter speed ratio is greater than a threshold, whether machine deceleration is greater than zero, and whether boom angle is less than a threshold. It will be recalled that transmission output torque may be used instead of torque converter speed ratio. If at step 135 the answer is true, the process may proceed to step 136 to set Dig Trigger to ON. If at step 135 the answer is false, the process may proceed to step 137 wherein electronic controller 40 will set Dig Trigger to OFF.

From either of steps 136 or 137 the process may proceed to step 138 wherein electronic controller 40 will query whether Dig Trigger is ON. If no, the process may proceed to step 127 to set the front and back diff lock multipliers equal to zero, and thenceforth to steps 145 and 146, and return to START 104 to begin the process anew.

If at step 138 the Dig Trigger is ON, the process may proceed to step 147 wherein electronic controller 40 will initiate determining parameter thresholds. Steps 147, 139, 140, 141, 142, 143, 144 and 128 represent implementation of a hysteresis feature to avoid oscillations in the locking state of differentials 50a and 50b, similar to the foregoing description of the auto-diff mode determination. From step 147, the process may proceed to step 139 wherein electronic controller 40 will query whether Angle Exceed is ON. If no, the process may proceed to step 141 wherein electronic controller 40 will set the threshold articulation angle for changing a locking state of differentials 50a and 50b to about 35 degrees. If at step 139 the Angle Exceed is ON, the process may proceed to step 140 to set the threshold articulation angle to about 30 degrees. It will be noted that the articulation angle values for the Dig Trigger determination are larger than those for the Auto Diff determination. This will typically be the case, as it is generally desirable to lock the differentials across a larger range of articulation angles for digging operations to optimize machine traction control.

From either of steps 140 or 141 the process may proceed to step 142 wherein electronic controller 40 will query whether articulation angle is less than the threshold. If no, the process may proceed to step 144 to set Angle Exceed to ON, then to step 127 to set the front and back diff lock multipliers equal to zero, thenceforth to step 145, and will continue as described above. If in step 142, articulation angle is less than the threshold angle, the process may proceed to step 143 wherein electronic controller 40 will set Angle Exceed to OFF. From step 143, the process may proceed to step 128 to set the front and back diff lock multipliers equal to 1, thenceforth to step 145, and will continue as described above.

Figure 3A:
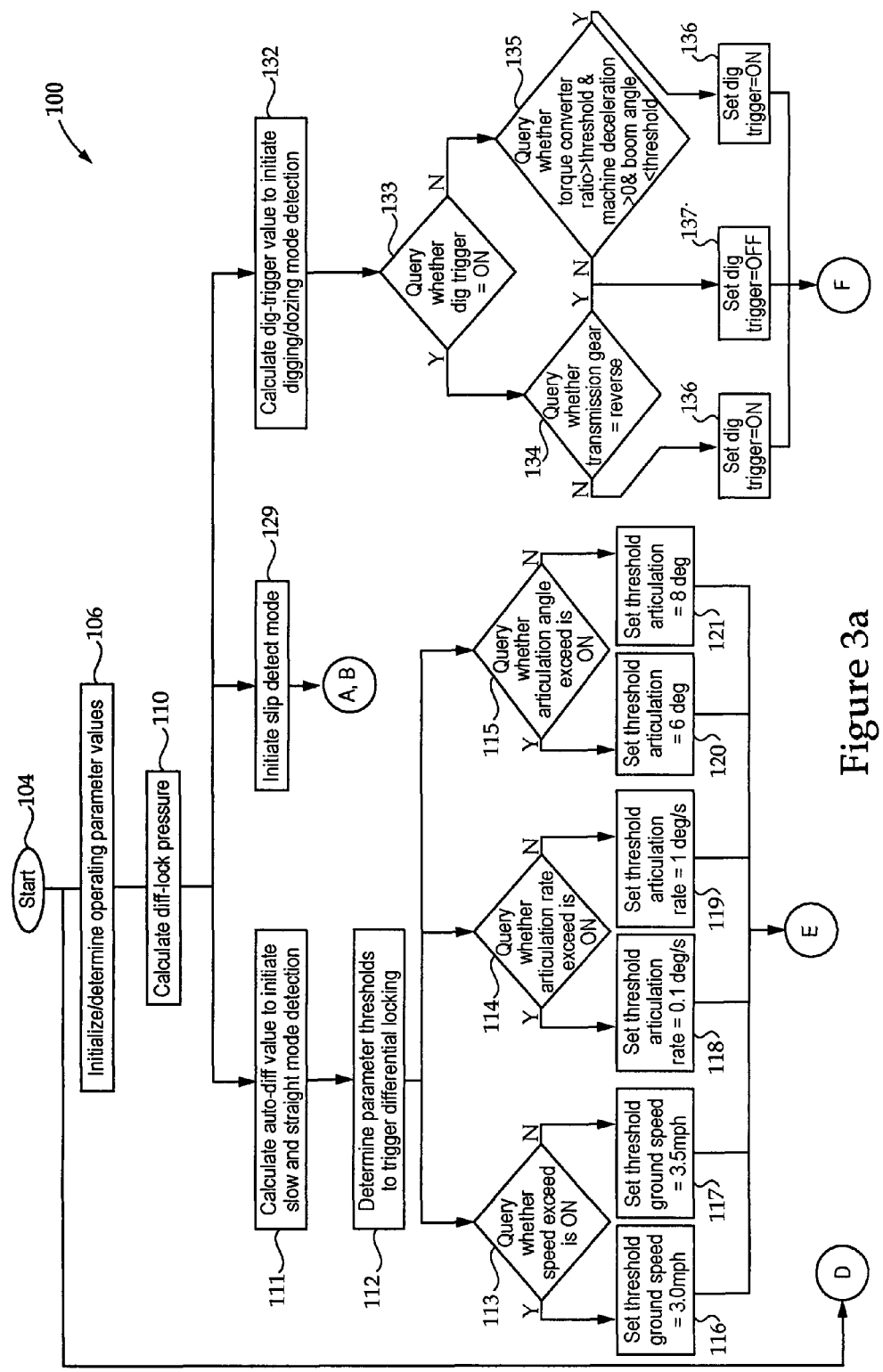
FIG. 3a is a flowchart illustrating a portion of an exemplary control process according to the present disclosure.
Figure 3B:
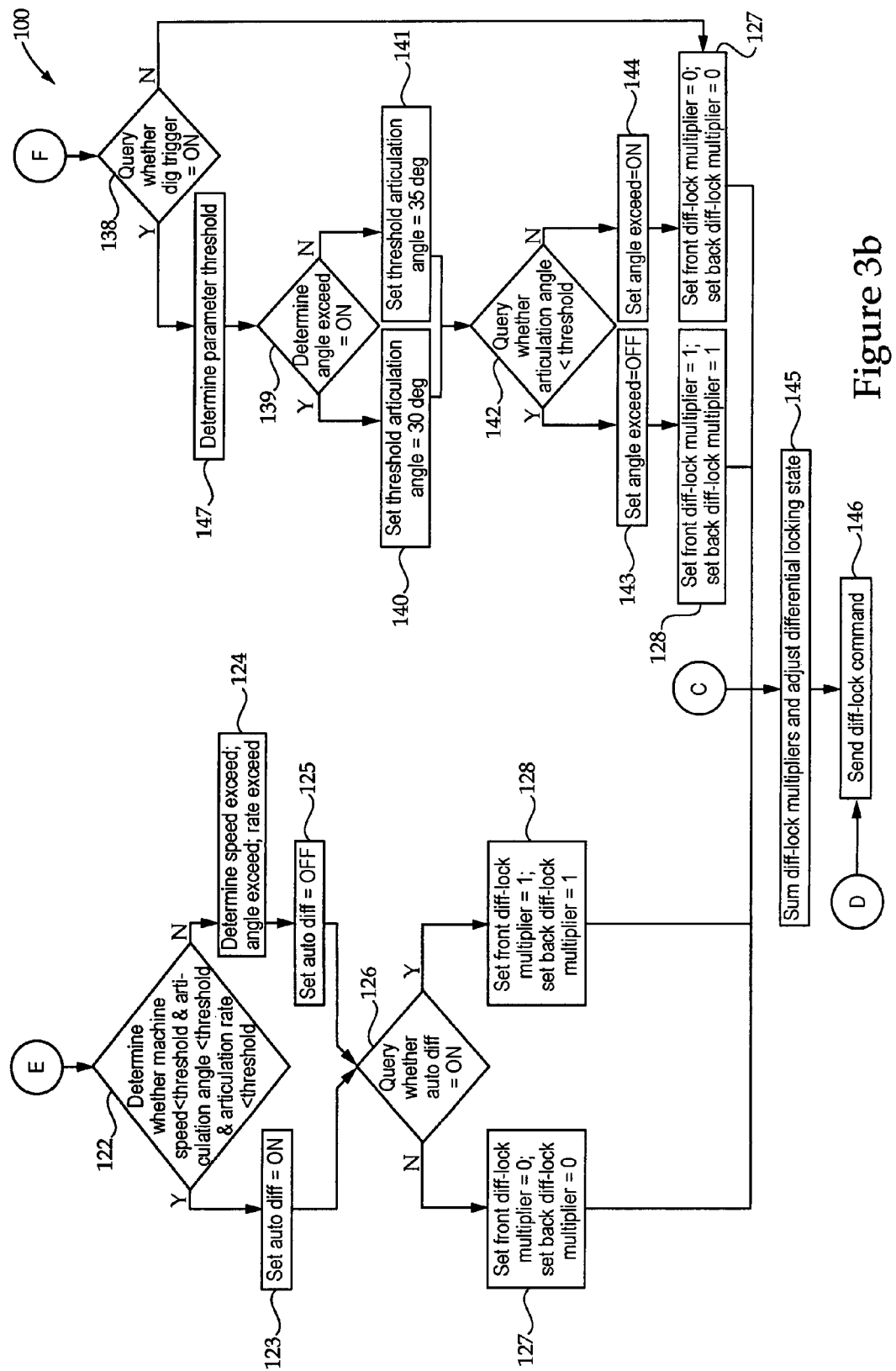
FIG. 3b is a flowchart illustrating another portion of an exemplary control process according to the present disclosure.
Figure 3C:
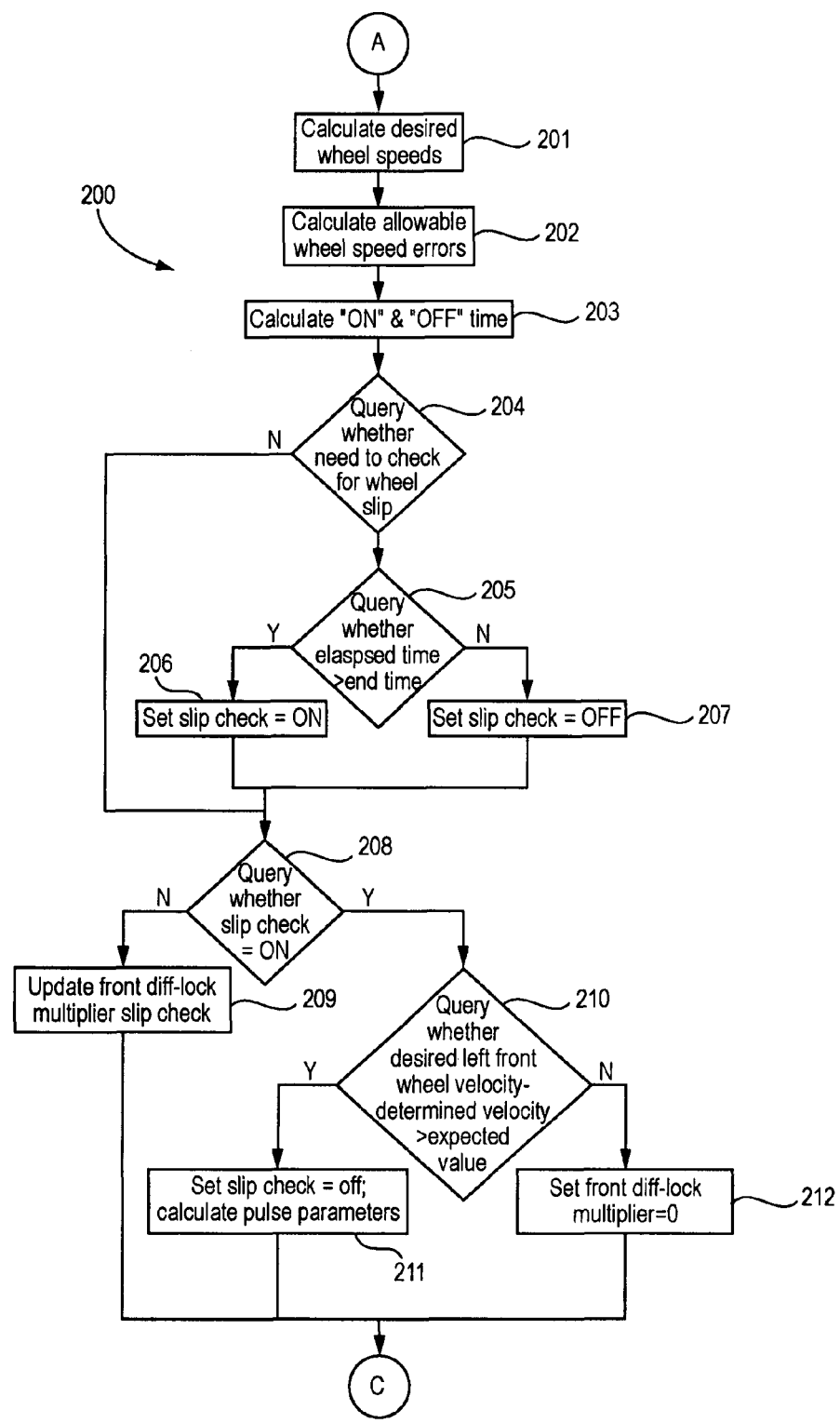
FIG. 3c is a flowchart illustrating another portion of an exemplary control process according to the present disclosure.

As described above, a Slip Detect routine may be implemented concurrently with the Auto Diff and Dig Trigger routines. At step 129, electronic controller 40 will initiate Slip Detect, and proceed via one of two embodiments described herein. Referring to FIG. 3c, there is shown a first embodiment of a portion of a Slip Detect routine 200 according to the present disclosure. The first embodiment of the Slip Detect routing is based generally on wheel speeds. Where the embodiment of FIG. 3b is implemented, the process may proceed from step 129 via "A" to step 201, wherein electronic controller 40 will initiate calculating desired wheel speeds, including separate speeds for left and right front wheels, and left and right back wheels, for example.

From step 201, the process may proceed to step 202 wherein electronic controller 40 may determine allowable wheel speed errors, and thenceforth to step 203 to calculate ON and OFF times for wheel slip detection. From step 203, the process may proceed to step 204 wherein electronic controller 40 will query whether checking for wheel slip is needed. If no, the process may proceed ahead to step 208. If yes, the process may proceed from step 204 to step 205 wherein electronic controller 40 will query whether an elapsed time is greater than an end time for wheel slip detection. If no, the process may proceed to step 207 to set Slip Check to OFF. If yes, the process may proceed to step 206 wherein electronic controller 40 will set Slip Check to ON. From either of steps 206 or 207, the process may proceed to step 208 wherein electronic controller 40 will query whether Slip Check is ON. If no, the process may proceed to step 209 wherein electronic controller 40 will update the front diff lock multiplier. If Slip Check is ON at step 208, the process may proceed to step 210 wherein electronic controller 40 will query whether a difference between desired left front wheel velocity and determined velocity is greater than an expected value. If no, the process may proceed to step 212 wherein electronic controller 40 will set the front diff lock multiplier equal to zero. If yes, the process may proceed to step 211 wherein electronic controller 40 will set Slip Check to OFF, and will calculate pulse parameters for pulsing at least one of the differential clutches toward a locked state. From either of steps 211 and 212, the process may proceed via "C" to step 145.

Figure 3D:
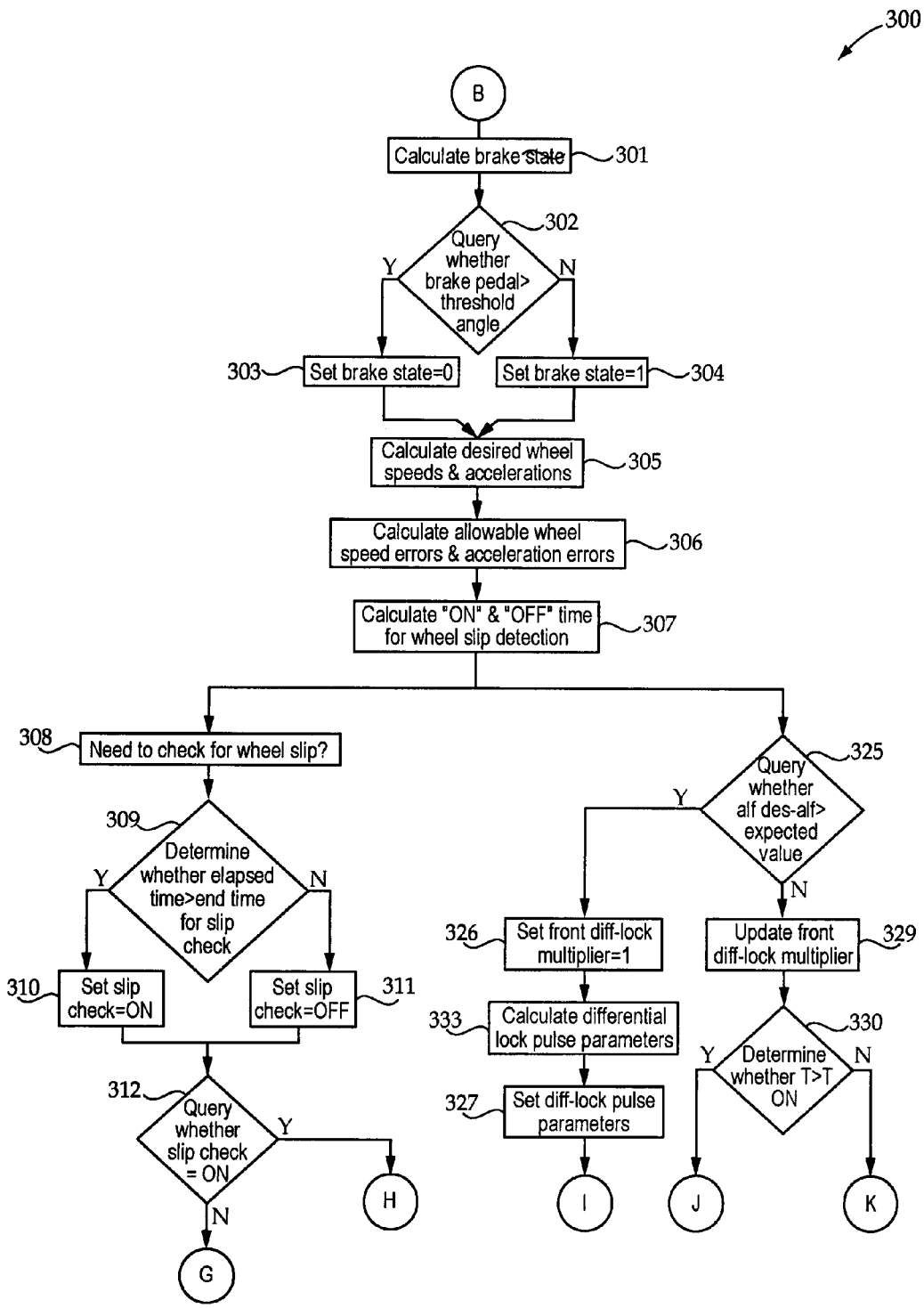
FIG. 3d is a flowchart illustrating yet another portion of an exemplary control process according to the present disclosure.
Figure 3E:
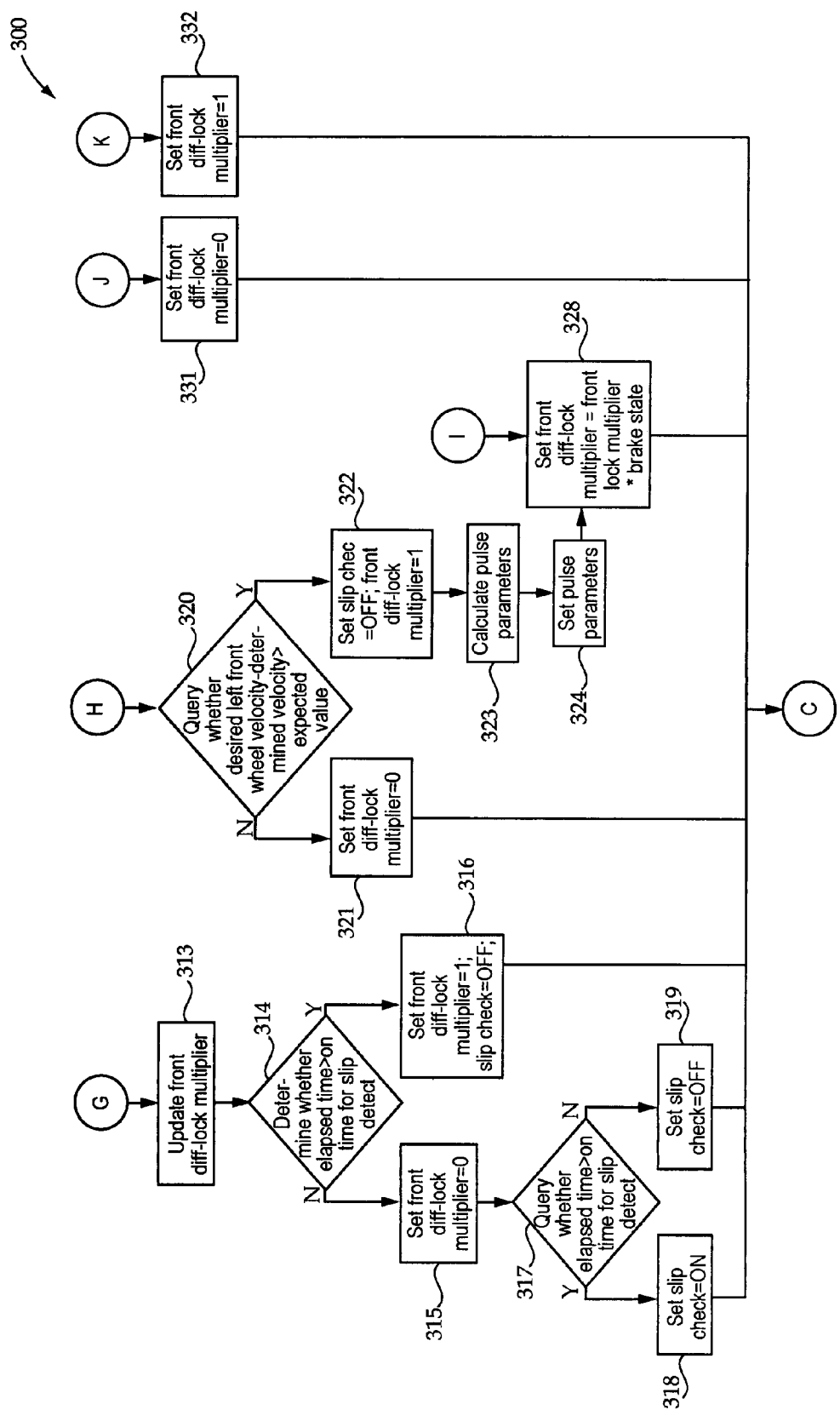
FIG. 3e is a flowchart illustrating yet another portion of an exemplary control process according to the present disclosure.

Turning to FIG. 3d-e, there is shown a second embodiment of a Slip Detect routine 300 according to the present disclosure. From step 129, the process may proceed via "B" to step 301 wherein electronic controller 40 will calculate a brake state, or brake pedal angle, of machine 10. From step 301, the process may proceed to step 302, wherein electronic controller 40 will query whether brake pedal angle is greater than a threshold angle. If no, the process may proceed to step 304 wherein electronic controller 40 will set the brake state equal to 1. If yes, the process may proceed to step 303 wherein electronic controller 40 will set the brake state equal to zero. From either of steps 303 or 304, the process may proceed to step 305 wherein electronic controller 40 will calculate desired wheel speeds and desired wheel accelerations for the wheels of machine 10.

From step 305, the process may proceed to step 306 wherein electronic controller 40 will calculate allowable wheel speed errors and allowable wheel acceleration errors. From step 306, the process may proceed to step 307 wherein electronic controller 40 will calculate an ON time and an OFF time for wheel slip detection. From step 307, the process may proceed to steps 308 and 325 in parallel.

At step 308, it may be desirable to check for wheel slip, and the process may thus proceed to step 309 wherein electronic controller 40 will query whether an elapsed time is greater than an end time for the Slip Check routine. If no, the process may proceed to step 311 wherein electronic controller 40 will set slip check to OFF. If yes, the process may proceed to step 310 wherein electronic controller 40 may set slip check to ON. From either of steps 310 or 311, the process may proceed to step 312 wherein electronic controller 40 will query whether slip check is set to ON. If yes, the process may proceed to step 320, described below.

If slip check is not set to ON at step 312, the process may proceed to step 313 wherein electronic controller 40 will update the front diff lock multiplier. From step 313, the process may proceed to step 314 wherein electronic 40 will query whether elapsed time is greater than an ON time for the slip check routine. If no, the process may proceed to step 316 to set the front diff lock multiplier equal to 1, and set Slip Check to OFF. From step 316, the process may return via "C" to step 145. If at step 314, the elapsed time is greater than the ON time for the slip check routine, the process may proceed to step 315 wherein electronic controller 40 will set the front diff lock multiplier equal to zero. From step 315, the process may proceed to step 317, wherein electronic controller 40 will query whether elapsed time is greater than an end time for the slip check routine. If no, the process may proceed to step 319 wherein electronic controller 40 will set slip check to OFF, and thenceforth via "C" to step 145. If yes at step 317, the process may proceed to step 318 to set slip check to ON, and thenceforth via "C" to step 145.

Returning to step 312, if slip check is set to ON at 312, the process may proceed to step 320 wherein electronic controller 40 will query whether the difference between desired left front wheel speed and determined left front wheel speed is greater than an expected value. If no, the process may proceed to step 321 to set the front diff lock multiplier equal to zero. If yes, the process may proceed to step 322 wherein electronic controller 40 will set slip check to OFF, and the front diff lock multiplier equal to 1. From step 322, the process may proceed to steps 323 and 324 wherein electronic controller 40 will calculate and set, respectively, the differential lock pulse parameters. From step 324, the process may proceed to step 328, described below.

Returning to step 325, it will be recalled that step 325 may be carried out in parallel with step 308. At step 325, electronic controller 40 will query whether the difference between desired left front wheel acceleration and the determined left front wheel acceleration is greater than an expected value. If yes, the process may proceed to step 326 to set the front diff lock multiplier equal to 1. From step 326 the process may proceed to steps 333 and 327 wherein electronic controller 40 will calculate and set, respectively, the differential lock pulse parameters. From step 326, the process may proceed to step 328 wherein electronic controller 40 will multiply the front diff lock multiplier by the brake state, and thenceforth via "C" to step 145.

If at step 325, the answer is no, the process may proceed to step 329 wherein electronic controller 40 will update the front diff lock multiplier. From step 329, the process may proceed to step 330 wherein electronic controller 40 will query whether elapsed time is greater than an ON time for the slip detect routine. If yes, the process will proceed to step 331 to set the front diff lock multiplier equal to zero. If no, the process may proceed to step 332 to set the front diff lock multiplier equal to 1. From either of steps 331 and 332, the process may proceed via "C" to step 145.

The presently described process and machine provides for electronic control of the locking state of a machine differential in a manner that is transparent to the operator. Wear and tear on the machine is reduced as compared to earlier designs, where overuse and under-use of the locking differentials was problematic. Moreover, because the differentials are proactively locked up, rather than only after detecting wheel slip, operating efficiency can be improved. The present disclosure may further include an embodiment wherein wear and tear on certain components of the drive train, or even the tires, may be estimated. Sensed machine parameters can be used to estimate damage to the clutches during every engagement. If estimated damage is excessive, operation of the clutches can be restricted to prevent failure.

The present description is for illustrative purposes only, and should not be construed to narrow the breadth of the present disclosure in any way. Thus, those skilled in the art will appreciate that various modifications might be made to the presently disclosed embodiments without departing form the intended spirit and scope of the present disclosure. For example, while the three separate modes/routines described above, digging/dozing, high-torque, low-speed, and slip detect represent one practical way to categorize the different machine operations, and hence determine different locking and unlocking strategies, the present disclosure is by no means thereby limited. Different machine types may have their operation best characterized as having more than three modes, or less than three modes. For example, a loader or tractor equipped with a dozer blade whose sole purpose is to push piles of gravel around in a quarry might have only one operating mode suitable for a differential locking strategy according to the present disclosure. Other machine types might have many different modes, each having a unique pattern of sensor inputs that correspond with appropriate conditions for locking and unlocking the differentials. Other aspects, features and advantages will be apparent upon an examination of the attached drawings and appended claims.

What is claimed is:

1. A method for controlling differential locking in a machine comprising:
   monitoring at least one operating parameter of the machine other than wheel slip, including receiving signals indicative of a machine operating mode;
   controlling locking of at least one differential of the machine responsive to the at least one operating parameter where the machine is in an operating mode where wheel slip is relatively more likely; and
   controlling unlocking of the at least one differential responsive to the at least one operating parameter where the machine is in an operating mode where wheel slip is relatively less likely;
   wherein controlling locking further includes proactively commanding locking of the at least one differential.

2. The method of claim 1 wherein:
   controlling locking further comprises generating a differential locking control signal when the at least one operating parameter is in a first portion of a range of possible parameter values; and
   controlling unlocking further comprises generating a differential unlocking control signal when the at least one operating parameter is in a second portion of the range of possible parameter values that is not contiguous with the first portion.

3. A method for controlling differential locking in a machine comprising:

monitoring at least one operating parameter of the machine other than wheel slip, including receiving signals indicative of a machine operating mode;

controlling locking of at least one differential of the machine responsive to the at least one operating parameter where the machine is in an operating mode where wheel slip is relatively more likely; and controlling unlocking of the at least one differential responsive to the at least one operating parameter where the machine is in an operating mode where wheel slip is relatively less likely;

wherein controlling locking further comprises generating a differential locking control signal when the at least one operating parameter is in a first portion of a range of possible parameter values; and wherein controlling unlocking further comprises generating a differential unlocking control signal when the at least one operating parameter is in a second portion of the range of possible parameter values that is not contiguous with the first portion;

the method further comprising determining the machine is in a material interaction mode based at least in part on the received signals, wherein controlling locking further comprises locking the at least one differential responsive to determining the machine is in a material interaction mode.

4. The method of claim 3 wherein the machine comprises a front differential and a back differential, and wherein monitoring at least one operating parameter further comprises receiving signals indicative of a machine ground speed, a transmission gear, a transmission output torque, an articulation angle and a linkage position.

5. The method of claim 4 wherein:

controlling locking further comprises generating differential locking control signals where the machine is in a forward gear less than or equal to 2, ground speed has decreased below a predefined speed, transmission output torque is greater than a reference torque, a lift angle of a linkage boom is less than a reference lift angle and articulation angle is less than a reference articulation angle; and controlling unlocking further comprises generating differential unlocking control signals where the machine is in a forward gear greater than 2 or a reverse gear and ground speed is above the predefined speed range.

6. The method of claim 4 wherein:

controlling locking further comprises generating differential locking control signals, if ground speed is less than a reference speed, articulation angle is less than a reference angle, and articulation rate is less than a reference rate; and controlling unlocking further comprises generating differential unlocking control signals, if ground speed is greater than a relatively higher reference speed, articulation angle is greater than a relatively higher reference angle, and articulation rate is greater than a relatively higher reference rate.

7. The method of claim 2 further comprising monitoring wheel slip of the machine, and controlling a locking state of at least one differential of the machine responsive to monitoring wheel slip.

8. The method of claim 7 wherein controlling a locking state of at least one differential responsive to monitoring wheel slip further comprises generating differential locking control signals, if a predetermined time has elapsed since a transmission gear change, ground speed is greater than a reference speed, and a predetermined wheel slip condition is sensed.

9. The method of claim 1 wherein the machine comprises an articulated wheel loader having a hydraulically actuated implement linkage and front and back lockable differentials each having a clutch and a hydraulic clutch actuator biased toward an unlocked position, and wherein controlling locking further comprises outputting differential locking control signals where wheels of the machine are not slipping.

10. A method for controlling differential locking in a machine comprising:

monitoring at least one operating parameter of the machine other than wheel slip, including receiving signals indicative of a machine operating mode;

controlling locking of at least one differential of the machine responsive to the at least one operating parameter where the machine is in an operating mode where wheel slip is relatively more likely; and controlling unlocking of the at least one differential responsive to the at least one operating parameter where the machine is in an operating mode where wheel slip is relatively less likely;

wherein the machine comprises an articulated wheel loader having a hydraulically actuated implement linkage and front and back lockable differentials each having a clutch and a hydraulic clutch actuator biased toward an unlocked position, and wherein controlling locking further comprises outputting differential locking control signals where wheels of the machine are not slipping; and wherein monitoring the at least one operating parameter other than wheel slip further comprises receiving signals corresponding to a ground speed, a linkage position, an articulation angle and a brake pedal position of the machine, the method further comprising disabling locking of the differentials responsive to at least one of ground speed, articulation angle, linkage position and brake pedal position.

* * * * *